April 24, 1928.
H. E. DICKINSON
GAS FLOOR FURNACE
Filed Dec. 29, 1926
1,667,625
3 Sheets-Sheet 1
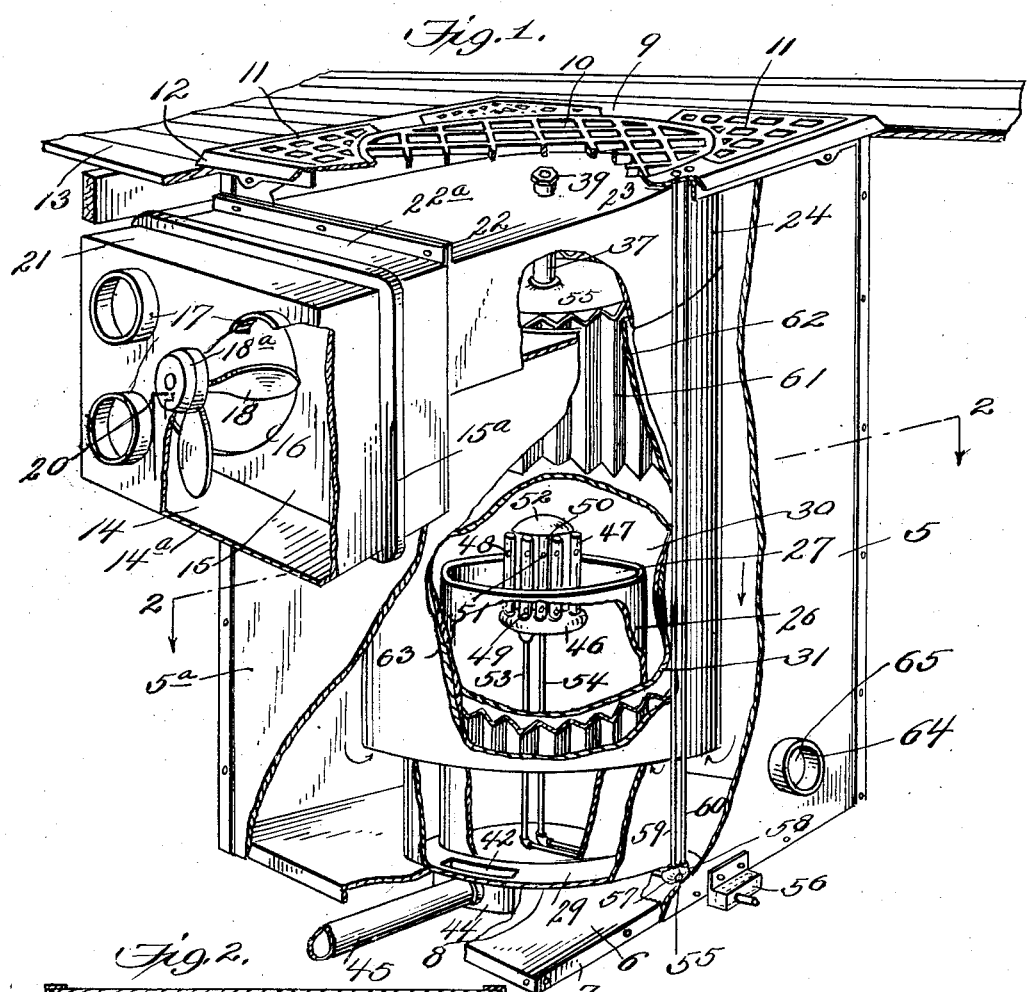
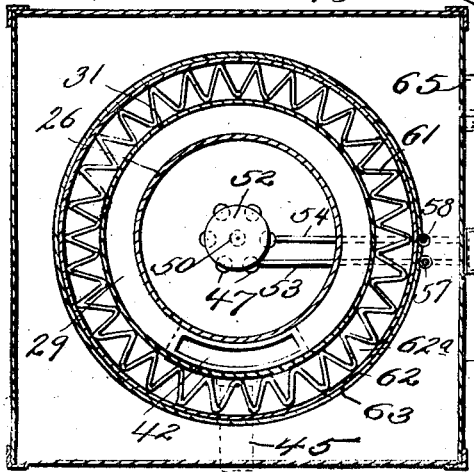
Inventor
Harry E. Dickinson
By
Attorney April 24, 1928.  H. E. DICKINSON  1,667,625

GAS FLOOR FURNACE

Filed Dec. 29, 1926  3 Sheets-Sheet 2

Inventor
Harry E. Dickinson
By
Attorney

April 24, 1928.  
H. E. DICKINSON  
GAS FLOOR FURNACE  
Filed Dec. 29, 1926

Inventor  
Harry E. Dickinson  
By  
Attorney

Patented Apr. 24, 1928.

1,667,625

UNITED STATES PATENT OFFICE.

HARRY E. DICKINSON, OF HOUSTON, TEXAS.

GAS FLOOR FURNACE.

Application filed December 29, 1926. Serial No. 157,782.

This invention relates to a floor gas furnace and heating apparatus having therein essential features which will adapt the same to be used as a hot air pipeless furnace, and by an addition to a part of the improved structure, as a hot air pipe furnace.

The primary object of the invention is to provide a gas furnace or heating apparatus of the class specified which is advantageously effective as a heating means and adapted to be installed or set up in operative position by suspending the same through the medium of a floor register of a novel form and constituting a part of the heater, and whereby a reliable and easy disposition of the furnace or heating apparatus ensues, the furnace or apparatus being readily interiorly accessible and controllable when necessity requires.

A further object of the invention is to generally improve a gas furnace or apparatus embodying therein a comparatively few number of components including a burner or vent chamber wherein the burners are partially projected and located, this chamber being essentially an inner vent chamber in its function, and a combustion chamber in which the said inner vent chamber is located together with an air heating chamber embodying a corrugated wall structure surrounding the said combustion chamber and having communication with an exterior fresh air supply through the medium of which currents of cold air are directed to the lower terminal of the heating chamber having the corrugated wall as well as with lower currents of cold air passing first downwardly to the bottom of the said air heating chamber and commingling with the fresh air from the exterior and then passing upwardly through the air heating chamber for delivery into a room directly above the furnace in a heated condition, and in one of the forms having means provided therein to supply the heated air to other compartments a distance from the furnace with a steady and reliable supply.

A still further object of the invention is to provide a gas furnace or heating apparatus of the class specified embodying therein a combustion chamber in which is located a burner of a novel form including a pilot light, which is accessible through the top of the furnace by simple means, for igniting the remaining burner members, the latter being at all times observable from the top of the furnace through a floor register forming a part of the furnace or heating apparatus and by means of which the latter is suspended in operative fixed position.

With the foregoing and other objects and advantages in view, the invention consists in the construction and arrangement of the several parts which will be more fully hereinafter described and claimed.

In the drawings:

Fig. 1 is a sectional perspective view of a gas furnace or heating apparatus embodying the features of the invention and showing a portion of the fastening means at the base omitted;

Fig. 2 is a horizontal section on the line 2—2, Fig. 1;

Fig. 6 is a perspective view of a furnace also embodying the features of the invention, and having the hot air conveying pipes and accessories incident thereto eliminated.

Figure 3:
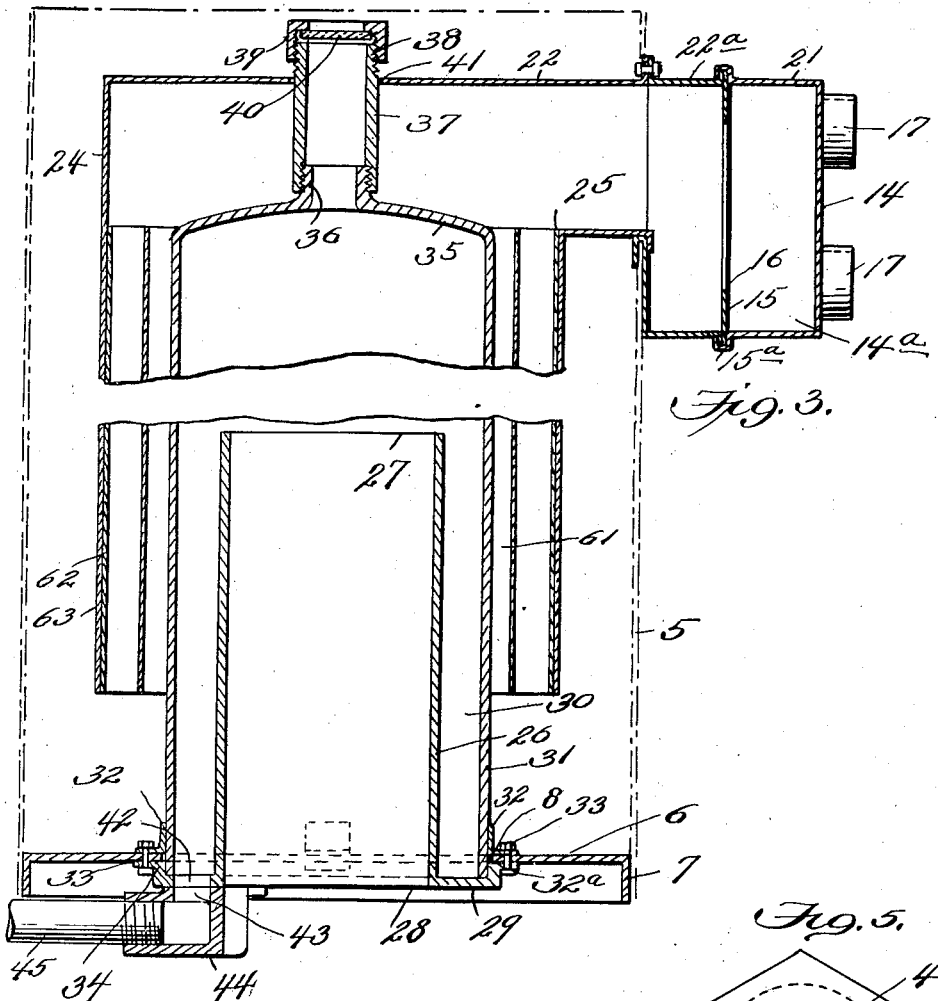
Fig. 3 is a transverse vertical section through the improved furnace with the register structure and burner omitted and showing the fastening means for the base.
Figure 4:
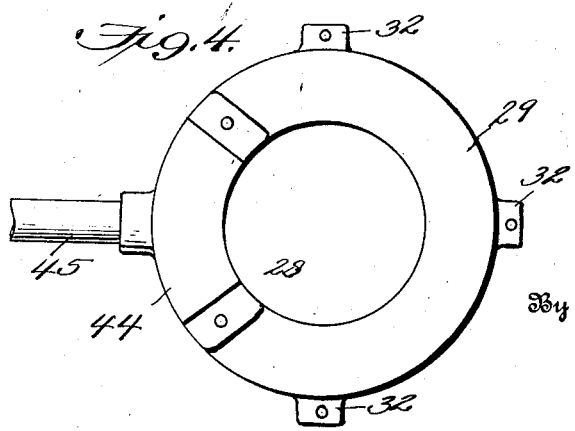
Fig. 4 is a detail plan view of parts of the base of the improved furnace.
Figure 5:
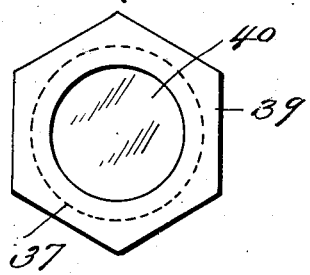
Fig. 5 is a top plan view of the sight opening device and removable cap therefor at the top of the furnace for observing the burners within the combustion chamber.

The numeral 5 designates an enclosing casing including a base 6 with a depending flange 7, the said base having an opening 8 therethrough. The casing 5 is secured at its upper end to a register 9 having a central removable section 10, preferably of circular contour, and removable corner sections 11, which render the interior of the improved furnace or heating apparatus readily accessible. The register is surrounded by an outwardly and downwardly inclined or outwardly flared supporting flange 12, which has its edge resting upon a floor 13 around a suitable register opening, the register being wholly located above and supported on the floor 13 and serving as the sole means for suspending the casing 5 and parts enclosed thereby. The casing 5, base 6 and register 9 will be formed of durable material, preferably metal, and suitably secured to provide a tight enclosure. The manner of securing the metal used in the construction of the enclosing casing may be varied as desired, and while it is preferred that the improved heater be suspended by the floor register as just explained, it is obvious that the same may be practicably supported in operative position by other means. At the upper part of one side of the casing 5 is a heat distributing chamber 14 having a box-like enclosure 14ª constructed of sheet metal with a partition plate 15 extending therethrough and peripherally jointed as at 15ª, said partition plate having an opening 16 of such dimensions as to permit heat currents to pass into the chamber and be distributed from the latter by means of suitable pipes connected to collars 17 projecting outwardly from the front side of the said box-like enclosure and leading off to various heat flues for conveying the heated air currents to the compartments or rooms of a building.

To assist in the circulation of the heated air currents coming through the opening 16 into the chamber 14 by way of the pipes leading off from the collars 17 to various compartments or rooms, a bladed fan 18 is installed and suitably driven, as for instance by an electric motor 18ª, to which current is supplied by means of wires 20 from any suitable electrical source. The box-like enclosure for the chamber 14 is applied to the side 5ª of the casing 5. The top wall 21 of the chamber 14 continues inwardly to the top 22ª of the interior chambered structure 22, having a rear curved edge 23, from which depends an inner vertical curved wall 24, an opening 25 being formed in the bottom of this supplemental chambered structure, as clearly shown by Fig. 3. The top 22ª of this supplemental chamber 22 is located directly under and at a distance from the register 9, and rises at an elevation above the top of the said interior structure of the furnace or heating apparatus and far enough below the said register to avoid interference with the placement and removal of the parts of the latter. The bottom wall 21 of the chamber 14 continues inwardly to the upper portion of the interior furnace structure.

Within the opening 8 of the base 6 a circular burner or vent chamber 26 is mounted and formed fully open at the top 27 and bottom 28. This burner chamber rises from or forms a part of an annular base or ring 29, which is located below the plane of the base 6, as shown by Fig. 3, and concentric therewith is a combustion chamber 30 having a surrounding wall 31 provided with lower outer angle fastenings 32, whose horizontal members rest on the base 6 and are secured to corresponding fastenings 32 by short nutted bolts 33, which extend through the base 6, and whereby the burner and combustion chambers 26 and 30 are positively united and sustained in proper relative positions. The annular base 29 is in the form of a recessed ring with an upwardly projecting surrounding flange 34, and by this means the lower end of the wall 31 of the combustion chamber 30 is further supported and held reliably assembled with the said base or ring 29. The wall 31 of the combustion chamber 30 extends upwardly and continues into a top 35, which forms an upper closure for the said combustion chamber, the top being provided with a central externally screw-threaded collar 36, to receive the lower end of a tube 37, which extends upwardly from the collar 36 a suitable distance and has an upper exteriorly screw-threaded end 38 with a removable cap 39 holding or carrying therewith a transparent plate or mica covering 40, as shown by Fig. 3. The top closure 22 has an opening 41 formed therein through which the upper screw-threaded end 38 of the tube 37 projects to render the cap 39 accessible through the register 9 above.

In the annular ring 29 an opening or slot 42 is formed which communicates with a correspondingly shaped opening or slot 43 at the upper end of a chambered coupling box 44 secured closely against the underside of the annular base or ring 29 and located fully below the latter, said chambered coupling box having a galvanized iron vent pipe 45 applied thereto as shown, and running to a chimney flue or other means of escape for the products of combustion. Within the burner or vent chamber 26 it is preferred to install the burner structure disclosed by my pending application Serial No. 126,533, filed August 2, 1926. These burners extend only partially, or a comparatively short distance downwardly into the said burner or vent chamber 26, the latter chamber serving mainly as a vent chamber. This burner structure comprises a manifold or base chamber 46 from which a plurality of circularly arranged burner tubes 47 extend upwardly, said burner tubes being formed with upper closed ends and orifices 48 at a suitable distance below the same as well as lower transverse air passages 49 containing a suitable gas burner spud, and interiorly located with relation to this group of burner tubes is a pilot light or tube 50, which is suitably apertured as at 51 and closed at the top. On top of the pilot light 50 is a canopy or spreader 52 at a distance above the upper closed ends of the tubes 47, all as clearly disclosed in my pending application above noted. The burner tubes 47 and pilot light 50 are supplied with gas by separate supply pipes 53 and 54, respectively communicating with the manifold 46 and the said pilot light or burner 50 and united as at 55 and then continued in single form through a union box 56 to a main or other source of supply. Valves 57 and 58 are located in the pipes 53 and 54 adjacent the box 56 and at the point where the two pipes unite and are respectively controlled by valve-operating rods 59 and 60 extending upwardly through the interior of the furnace or heating apparatus and accessible at the floor register 9, as shown, and may be readily manipulated to first supply gas or fuel to the pilot burner 50 and at which time the rod 60 is operated to open the valve 58 and the rod 59 operated to close the valve 57. The pilot light or burner 50 is ignited through the tube 37 by removing the cap 39, which is made accessible by first withdrawing the central grated section 10 of the floor register. A lighted taper or analogous device is lowered through the tube 37 and of such length as to reach the pilot burner and ignite the latter, and subsequently the valve 57 is opened by operating the rod 59, and after ignition of the burner tubes 47 ensues, the pilot light 50 is kept burning, or extinguished by suitably manipulating the valve 58 through its operating rod 60. The burner tubes 47 and pilot light 50 project above the upper terminal of the burner chamber 30 as shown by Fig. 1, and the canopy or spreader 52 is also located at some distance above the upper termination of the burner chamber so that the heating function of the burner including the group of tubes 47 will be serviceably practicable. The pipes 53 and 54 extend down vertically from the manifold 45 to the bottom terminal of the burner chamber 30 and then pass out horizontally under the lower end of the said burner chamber and also under the annular base or ring 29 to the box 56 as heretofore explained.

Surrounding the combustion chamber is a series of angular heat radiating corrugations 61, and surrounding these corrugations is a circular wall 62 forming an outer heating chamber 62ª, which terminates at its upper open end within the opening 25, as at the bottom portion of the supplemental chambered casing 22 of the furnace shown by Figures 1 to 5 inclusive. The outer side of the circular wall 62 of the heating chamber 62ª is sheathed by an asbestos covering 63, it being seen, by reference to Fig. 3, that the bottom of this chamber 62ª is fully open and that the said wall and angular corrugations 61 terminate at a distance above the base 6, to give ample space for the upward circulation or movement therethrough of the currents of cold air. The upper part of the wall 62 extends through the opening 25 in the bottom of the supplemental chamber casing 22, as heretofore indicated, and thus there is no interference with the upward rise of the currents of heated air into the said chambered casing. The heated air currents which circulate through the chamber 62ª, pass into the chamber 22 and thence pass into the chamber 14 through the opening 16 of the partition 15 for distribution to various parts of a building through the medium of the pipes heretofore described and connecting with the collars 17. The cold air adjacent the floor passes downwardly through all parts of the register 9, in this structure, to the lower limit of the outer heating chamber 62ª between the outer asbestos-covered wall 62 and the walls of the casing 5, and mingles with the cold air admitted from the exterior by a pipe connected to a collar 64 surrounding an inlet opening 65, and mingles with the cold air thus admitted through the said inlet and then passes upwardly through the heating chamber 62ª and becomes heated, and then passes into the casing 22 for distribution as heretofore explained, it being intended that fresh air will be taken from the exterior of the building in which the improved furnace is installed.
The cold air passing downwardly from the exterior, as just explained, also becomes heated by passing upwardly within the outer chamber 62ª in contact with the angular corrugations 61.

The furnace as shown by Figure 6 is of a pipeless, gravity nature, and embodies all the interior furnace elements heretofore described except the chamber 14ª and the box-like enclosure 14 defining said latter chamber together with the fan and the supplemental casing defining the chamber 22ª. The outer heating chamber 62ᵇ in this second form of the furnace extends fully to the central circular member 10 of the register 9, and from this member 10 the heat currents pass upwardly into a compartment or room for heating purposes, the cold air passing downwardly through the members 11 of said register into the furnace. In other structural respects this second form of furnace is similar to the first form of furnace heretofore described, and the same reference characters are applied thereto.

From the foregoing it will be seen that the products of combustion from the burner chamber 26 in both furnace structures are carried off by way of the slot 42 and pipe 45 into a flue, which may be located at a distance from the furnace or heating apparatus.
Furthermore, the outer heating chamber 62ª or 62ᵇ serves to thoroughly heat the cold air passing upwardly through the said chamber, and the temperature of the cold air is materially increased by the radiation issuing from the wall surrounding the inner heating chamber 30 and the angular corrugations 31. In the first form of the furnace, the fan, located mainly interiorly of the chamber 14ª, causes the heated currents entering this chamber to be forcefully driven through the openings and outlet collars 17 surrounding the same into and through the heat-conveying pipes leading off from the furnace or heating apparatus to different distributing points.

What is claimed as new is:

1. A gas floor furnace of the class specified, having enclosing means and an inner vent chamber with burners therein including a pilot light and combustion and heating chambers surrounding the said burner chamber, the lower part of the furnace having means for supplying air to and carrying off the products of combustion therefrom and also means for admitting cold air, an upper supplemental casing with a top closure plate and an outer distributing chamber with which the burners and combustion and heating chambers cooperate as heating means, a register over the top of the closure plate having removable members, and a tube extending upwardly from an interior part of the furnace and through the said closure and having a removable cap with a transparent covering for igniting a part of the burners and for observing the operation of the latter through the top of the furnace.

2. A gas floor furnace of the class specified, comprising an enclosing casing with an opening through the base thereof, a burner chamber opening through the base and surrounded by a combustion chamber with a closed top, the combustion chamber being provided with an outlet opening having a pipe adapted to connect with a flue and an enclosing casing having a fresh air inlet, an insulated heating chamber surrounding the combustion and burner chambers and extending to the upper part of the furnace, a plurality of burners in the burner chamber including a pilot burner and having separate valve supply means with controlling devices extending upwardly through the furnace to the top of the latter, a supplemental casing mounted over the burner combustion and heating chambers and having a distributing chamber at the exterior of the enclosing casing and also including a top closure and with which the burner, combustion and heating chambers cooperate as heating means, a fan located in said distributing chamber, the combustion chamber having means for carrying off the products of combustion therefrom, a top register for supporting the furnace from a floor and comprising a series of central and corner removable sections, and a tube rising from the top of the combustion chamber through the top closure and having a removable cap with a transparent covering for controlling the ignition of the burners and also for observing the operation of the latter from the top of the furnace.

3. A gas floor furnace of the class specified, having an outer enclosing casing and a top register to which said casing is attached for suspending the furnace as a whole, a burner chamber in the lower part of the furnace and opening through the bottom of the casing and having a plurality of burners therein including a pilot burner with supply means controlled by devices extendng upwardly through the top of the furnace, a combustion chamber and closed at the top and provided with means at the bottom for egress of the products of combustion to a flue, the top of the combustion chamber having a tube extending upwardly therefrom with a removable cap, the cap having a covering of transparent material and the top of the tube and cap being located at a distance above the combustion chamber for preliminarily igniting the burners and for observing the operation of the latter, an outer heating chamber surrounding the combustion and burner chambers and extending fully to the top of the furnace and register and partway downwardly over the latter and having an opening at the bottom, a series of vertical corrugations being interposed between the combustion chamber and the outer wall of the heating chamber and providing heat radiating means, and a supplemental casing having a horizontal top closure above the upper closed top of the combustion chamber and including an exterior distributing chamber with openings therethrough for distribution of heated air to different parts of a building, and a fan in the said distributing chamber to accelerate the circulation of the heated air.

4. A furnace of the class specified, comprising a cylindrical combustion chamber with an air vent chamber centrally located therein and having burners extending partially thereinto from the top and controllable supply means for the burners, the top of the combustion chamber being closed and having a tube rising from the center thereof and provided with a removable cap having a transparent covering for observing the gas burners and gas combustion in the combustion chamber, the said inner vent chamber being fully open at the top and bottom, and an enclosing casing having a square metal base with a circular opening in its center over which the open bottom of the vent chamber is mounted, a metal flue being attached to the lower portion of the combustion chamber.

5. A furnace of the class specified, comprising an enclosing casing with a base having an opening therethrough, a combustion chamber mounted on said base and connected to the latter with a flue attached to the lower portion thereof, and also having a centrally located air vent chamber herein, a supplemental casing over the top of the combustion chamber with an outer distributing chamber provided with outlets and a fan for distribution of hot air currents through hot air pipe outlets, and an outer heating chamber opening through the bottom of said supplemental casing.

6. In a furnace of the class specified, the combination of a base with an opening therethrough, an inner vent chamber located above the base and open at the upper and lower ends and supported by said base over the opening in the latter, the said chamber having burners extending partially downwardly thereinto from the open top and also above the said open top and including a pilot light and gas supply connections and controlling valves therein, a combustion chamber surrounding the vent chamber and extending above the same and formed with a closed top having a tube extending vertically thereabove with a removable cap supplied with a sight opening having a transparent cover and operable for lighting the pilot light and observing the burners from the top of the furnace, the burners extending upwardly partway into the combustion chamber, an outer heating chamber surrounding the inner combustion chamber and open at its upper and lower extremities, the upper extremity having communication with an outlet for the hot air, and an outer casing having a top register comprising removable angular corner members and a circular center member and serving to suspend the furnace as a whole from the support, the removable angular corner and circular center members providing for an extended opening at the top of the furnace.

7. A furnace of the class specified, comprising a base with an opening therethrough, an inner centrally located vent chamber open at the top and bottom and communicating with the opening of the base, the vent chamber having a plurality of burners extending partially downwardly thereinto at the top thereof and also projecting above the said chamber and provided with means for igniting the same and with gas supply means and controlling valves, valve operating rods extending upwardly through the top of the furnace, an inner combustion chamber surrounding and projecting above the said vent chamber and provided with a removable closed top portion from which means project upwardly to provide for observation of the burners below in the vent chamber and igniting the burners, means for supplying air to the said inner combustion chamber, and an outer heating chamber fully open at the bottom and extending to the upper part of the furnace and also open at its upper extremity and through which cold air downwardly circulates and is heated.

8. A furnace of the class specified, comprising heating means and chambers in concentric relation, and an upper register for suspending the furnace as an entirety from the floor and comprising a readily removable central circular member and readily removable angular corner members to provide for forming a large exposing opening at the top of the furnace.

9. A furnace of the class specified, having an outer enclosing casing and a top register to which said casing is attached for suspending the furnace as a whole, an inner vent chamber of circular form centrally located in the lower part of the furnace and opening through the bottom of the casing and provided with a fully open top and having a plurality of burners in the upper portion thereof and projecting above said open top and also downwardly into the chamber with fuel supply means controlled by devices extending upwardly through the top of the furnace, a combustion chamber surrounding and spaced from the said vent chamber and provided with lower means for egress of the products of combustion to a flue and also formed with a closed top from which upwardly projects means for inspecting the interior of the furnace and the burners below, and an outer heating chamber projecting partially downwardly over and surrounding the combustion chamber and extending to the upper part of the furnace, the said heating chamber having an unobstructed opening at its lower end.

10. A gas floor furnace of the class specified, having an outer hollow enclosing casing with a base and a top register to which said casing is attached for suspending the furnace as a whole, the base having an opening therein and means for admitting fresh air, an inner air vent chamber in the center of the casing and located in a lower part of the furnace and having upper and lower open ends, the lower end of this vent chamber opening through the base of the casing and also provided at its upper open ends with a plurality of burners extending partially above the said upper open end and also downwardly into the said vent chamber and provided with controlling means for the supply of fuel thereto, a combustion chamber surrounding the said vent chamber and provided with means for egress of the products of combustion to a flue and having a closed top with an inspecting means extending thereabove which is also utilizable as means for igniting the burners, and an outer heating chamber surrounding the combustion and inner vent chambers and extending to the upper part of the furnace and part way downwardly over the vent and combustion chambers and having a fully open bottom, a series of vertical corrugations being closely interposed between the wall of the combustion chamber and the surrounding wall of the said heating chamber to provide heat radiating means.

In testimony whereof I have hereunto set my hand.

HARRY E. DICKINSON.